Dec. 15, 1959     P. M. G. TOULON     2,917,574
COLOR TELEVISION PICKUP SYSTEM
Filed April 7, 1955
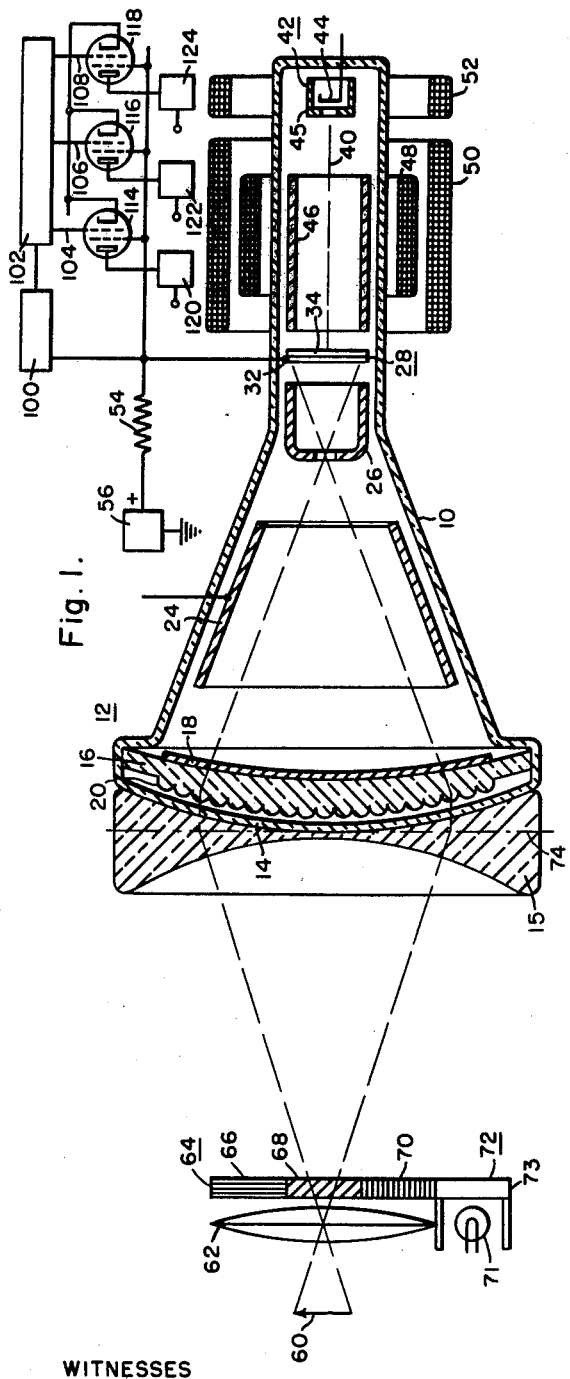
WITNESSES
INVENTOR
Pierre M. G. Toulon.
BY
ATTORNEY //
United States Patent Office 2,917,574
Patented Dec. 15, 1959

2,917,574

COLOR TELEVISION PICKUP SYSTEM

Pierre M. G. Toulon, Turtle Creek, Pa., assignor to Westinghouse Electric Corporation, East Pittsburgh, Pa., a corporation of Pennsylvania Application April 7, 1955, Serial No. 499,969

1 Claim. (Cl. 178—5.4)

My invention relates primarily to television systems and more particularly to pickup systems.

It is an object of my invention to provide an improved pickup system utilizing a single camera tube to produce signals corresponding to components of the viewed scene.

It is another object to provide an improved pickup system utilizing a single camera tube to produce signals corresponding to color components of the viewed scene.

It is another object to provide an improved pickup system utilizing a single camera tube to provide a pattern of sensing signals on the photosensitive electrode of the camera tube.

It is another object to provide an improved pickup system utilizing a single camera tube in which the picture elements are resolved into a plurality of sub-elemental components representative of component colors and an indexing signal interspersed to provide proper color signals at the transmitter.

These and other objects are effected by my invention as will be apparent from the following description taken in accordance with the accompanying drawings, throughout which like reference characters indicate like parts, and in which:

Figure 1 is a view partly in schematic illustrating a pickup system in accordance with my invention;

Fig. 2 is an enlarged view of a portion of Fig. 1 for purposes of explanation of my invention;

Fig. 3 is an enlarged view showing a portion of the photocathode of the camera tube illustrating the excited electron lines; and Fig. 4 is a graph representing the output waveform derived from the pickup system illustrated in Fig. 1.

Referring in detail to Fig. 1, the pickup system comprises a camera tube of any suitable type such as a vidicon, image orthicon, iconoscope or image vidicon. In the specific example shown in Fig. 1, a tube is shown which will hereafter be referred to as an image vidicon for purposes of explanation of my invention. The image vidicon is comprised of an evacuated envelope 10 with a spherical photocathode structure 12 positioned near the input window 14 of the tube 10. The photocathode structure 12 consists of a transparent supporting member 16 on which a photoemissive material layer 18 is deposited. The layer 18 is deposited on the remote side of support 16 with respect to the input window 14 of the tube. In the conventional image vidicon, the photocathode support member may be a sheet of glass with a conductive coating. If suitable photoemissive material is utilized, then the photoemissive material may be deposited directly onto a glass sheet without need of the conductive coating. In my device the only modification made from the conventional image vidicon is that one surface of the photocathode support member 16 is embossed or goffered on the opposite side with respect to the photoemissive coating 18. The surface of the photocathode support 16 on which the photoemissive material is deposited is substantially smooth. The goffered surface of the photocathode support 16 is in the form of cylindrical lenticulations 20, each of which may be of any desired width or diameter. In my specific embodiment, the goffered surface is comprised of a multiplicity of similar parallel cylindrical lenticulations or cylindrical lenses 20. These cylindrical lenticulations 20 have a radius of curvature such that light rays impinging on the lenses 20 are brought to a series of focal points within the body of the support 16 as indicated clearly in Fig. 2.

The remaining structure of the image vidicon may be of the conventional type such as described more specifically in the copending application, Serial No. 416,875, filed March 17, 1954, now abandoned, by Robert J. Schneeberger and assigned to the same assignee. In general, the description of the image vidicon comprises the photocathode structure 12 positioned near the input window 14 having a layer of photoemissive material 18 such as cesiated antimony deposited on the inner surface of the support member 16. A light image focussed onto the photocathode 12 results in the generation at the surface of the photoemissive layer 18 of a corresponding electron image which is a replica of the light image or pattern focussed on the photocathode 12. An electron lens system represented by the electrodes 24 and 26 is provided for focussing a contracted replica of this electron image onto a target 28 which is shown schematically in Fig. 1. The electrodes 24 and 26 may also take several type forms such as a continuous spiral of resistance coating on the wall of the envelope 10.

The target 28 is comprised of a thin layer of aluminum 32 that is substantially transparent to electrons focussed on it by the electron lens system. The face of the aluminum layer 32 remote to photocathode 12 is coated with a thin layer 34 of insulating dielectric such as arsenic trisulfide or amorphous selenium which is briefly rendered substantially conductive along the path of the bombarding electrons which have penetrated the aluminum layer 32. The face of the target 28 on which the insulating dielectric layer 34 is coated is scanned by an electron beam 40 directed thereon by a conventional cathode ray gun 42 comprising a cathode 44, focussing electrodes 45 and 46, deflecting coils 48, focussing coil 50 and aligning coil 52 of usual forms. The cathode 44 of the electron gun 42 is connected by a suitable lead (not shown) to ground, while the aluminum layer 32 is connected through a resistor 54 to a positive terminal of a direct current source 56 which has its negative terminal connected to ground. The output signal of the pickup tube is derived from the resistor 54.

The light from the object or scene 60 to be televised is in accordance with the invention focussed onto the photocathode 12 of the image vidicon tube by means of suitable lenses and filters. In the specific example shown herein there is provided an optical system for transmitting separate selected component color images of the object, and then means for dividing the color images into a multiplicity of interleaved actuation or excitation light line elements with a sensing signal interspersed among said interleaved line element signals. The sensing signal excitation pattern set up on the photocathode 12 is in the form of a line structure with the lines parallel to the image excitation elements.

Referring in detail to Fig. 1, the light from the object 60 is focussed through a first lens system 62 which is of any suitable type and is illustrated here as a convex lens. The lens system 62 may be of the conventional type utilized in a television camera. A more detailed description of a suitable lens system may be found in the revised edition of "Fundamentals of Physics," by H. Semat, chapter 30, and published by Sir Isaac Pitman & Sons, Ltd., or in the second edition of "Fundamentals of Optics," by F. A. Jenkins and H. E. White, and published by McGraw-Hill Book Company, Inc.

A suitable composite filter 64 is positioned on the opposite side of the lens system 62 with respect to the object 60 and may be comprised of three or more bands or areas 66, 68 and 70 having given wavelength transmissive properties. The three selected wave-length transmissive areas 66, 68 and 70 in the specific embodiment are laterally displaced with respect to each other within substantially one plane and positioned with their long dimension horizontal and parallel with respect to each other. The wavelengths are selected in the specific embodiment so that the middle filter area 68 is transmissive of light of a band of wavelengths with peak response at about 540 millimicrons which is substantially green in color. The upper filter area 66 is transmissive of light of a different band of wave-lengths with peak response at about 610 millimicrons which is substantially red in color. The lower filter area 70 is capable of transmission of light of different band of wavelengths than the areas 66 and 68 with peak response at about 450 millimicrons which is substantially blue in color. A more complete description of suitable filter means may be found in chapter 18 of "Television," 2nd edition, by V. K. Zworykin and G. A. Morton, published by John Wiley.

Positioned adjacent the composite filter 64 is a radiation source 72 which is laterally displaced with respect to the filter areas 66, 68 and 70 and of substantially of the same dimensions as one of the filter areas 66, 68 or 70. This radiation source 72 may be of any suitable form such as a radioactive source, a reflecting mirror provided with illumination, an electroluminescent light source or a conventional light element 71 positioned within an enclosure having a frosted glass plate 73 substantially the same size as one of the filter areas 66, 68 or 70.

It is also possible to place the sensing pattern directly on the photocathode structure 12 by use of radioactive strips. This would eliminate the need of the light source 72.

The light transmitted by the filter areas 66, 68 and 70 and the auxiliary light source 72 is focussed onto the goffered glass surface of the photocathode support 16 of the image vidicon. Since the optical lens system 62 positioned between the object 60 and the filter 64 focuses an optical image within a plane represented by the line 74, it is necessary to incorporate a concave concave lens 15 to focus the real image substantially on the spherical surface of the goffered surface of photocathode support 16. The concave concave lens 15 is positioned in front of a conventional image vidicon tube and may be cemented to the face plate 14 with a suitable material. The face plate 14 of the image vidicon may be designed to serve as the concave concave lens structure. The lens 15 would not be required in the more conventional type camera tubes having substantially planar face plates.

In the operation of the device shown in Figs. 1 and 2, the light from the object 60 is focussed by means of the lens system 62 in a plane represented by the line 74. The concave concave lens 15 modifies the optical plane 74 to conform to a spherical surface and the image is thereby brought to a focus on the goffered surface of the photocathode support structure 16. Each of the three filter areas 66, 68 and 70 transmit light from the object 60 of only one selected color while the auxiliary light source 72 transmits any suitable radiation of an intensity of the order of twice or more of maximum intensity transmitted by any one of the filter areas 66, 68 and 70 at any time. Since the filter areas 66, 68 and 70 and the auxiliary light source 72 are laterally displaced, in effect, the light rays from four sources are directed onto the photocathode 12 and will approach the goffered surface of the photocathode support 16 at different angles of incidence as indicated in Fig. 2. The light from any one filter area 66, 68 or 70 or the auxiliary source 72 activates only about ¼ of the area of the photoemissive material 18 under each of cylindrical lenses 20.

The position of this area of activation behind each cylindrical lens 20 is dependent upon the direction of approach of the rays of light. The cylindrical lenses 20 refract the light and operate in a manner more fully described in the revised third edition of "Color Cinematography," by Major Adrian Cornwell-Clyne, and published by Chapman & Hall, Ltd., pages 317 to 324. In general, since the filter areas 66, 68 and 70 and the auxiliary light source 72 are displaced laterally with respect to each other, the light rays from these structures will approach the photocathode structure 12 at different angles. This results in a line structure of activation or excitation on the photoemissive surface 18 behind each cylindrical lens 20 so that reading from top to bottom in Fig. 2, there is an area of activation 80 due to the auxiliary light source 72, an area of activation 82 due to the blue light from the image, an area of activation 84 due to the green light from the image and an area of activation 86 due to the red light from the image. The cylindrical lenses 20 which are horizontal and parallel to the filter areas 66, 68 and 70 and the auxiliary light source 72 provide in this manner a plurality of lines of excitation 80, 82, 84 and 86 behind each cylindrical lens 20 representative of the red, green and blue component of the elemental area of the image with an indexing or sensing electron line provided with each color triplet.

This excitation line structure as illustrated in enlarged view shown in Fig. 3, causes the photoemissive surface 18 to generate a corresponding electron line structure or pattern corresponding to the light from the filter 64 and the source 72 which is in turn accelerated to the target electrode 28. The electron beam 40 which scans the back of the target 28 is moved so as to scan the line structure charge on the target 28 transversely or in a vertical direction in the specific embodiment shown in Fig. 1.

An output signal may be derived from the tube by means of the resistor 54 connected to the target 28. The waveform of a possible output signal derived from the resistor 54 is represented by the graph shown in Fig. 4 for purpose of explanation. The first video impulse 90 shown in Fig. 4 is representative of the red color video component in the elemental area 86 of the image behind one cylindrical lens 20, while the next impulse 92 is representative of the green color component 84, while the next impulse 94 is representative of the blue component 86, and then a sensing signal impulse 96 representative of the sensing signal 80 from the auxiliary light source 72 is obtained. The values of the color video signals will vary with image transmitted; however, the sensing signal is of higher level at all times. This sequence repeats as the electron beam 40 scans across the target 28. The complete scansion of the target 28 element by element is accomplished in a manner well known in television techniques.

The output signal as represented by the graph shown in Fig. 4 may be converted to the conventional color type signal derived from three separate video cameras and transmitted by suitable means to a receiver where the color image may be reproduced in any suitable manner. A suitable system for converting the output signal shown in Fig. 4 into a three separate color component signal is represented schematically in Fig. 1. The output signal as represented by Fig. 4 is fed through a pulse separator 100 to extract only the sensing pulse 96. The pulse separator 100 operates to select the sensing pulse 96 in accordance with the level of the incoming pulses. As previously explained, the sensing signal 96 is of a much higher predetermined signal level than the video pulses 90, 92 and 94 and permits ease of separation.

The sensing pulse that is derived from the pulse separator 100 is fed into a suitable delay line 102 where three separate output pulses are obtained from the output terminals 104, 106 and 108. The delay line 102 is constructed so that the time difference in output signals is equal to the time required for the electron beam 40 of the pickup tube to pass from one excitation strip 80, 82, 84 and 86 to the next. The output pulse derived from the output terminals 104 is delayed in time with respect to the sensing pulse 96 so that the beam 40 would have moved to the strip 84 which is representative to the red video intelligence in pulse 90. The output terminal 104 is connected to the grid of a suitable gating tube 114 while the output terminals 106 and 108 are connected in a similar manner respectively to gating tubes 116 and 118. The pulse derived from the output terminal 106 is delayed with respect to the sensing pulse 96 so that the electronic beam would be positioned on strip 84 representative of the green video intelligence in pulse 92 while the pulse from output 108 is delayed in time with respect to sensing pulse 96 so that the beam would be positioned over the strip 82 representative of the blue video intelligence in pulse 94.

The gating tubes 114, 116 and 118 have at least one other grid which is supplied with the output signal derived directly from the target 28 of the pickup tube. In this manner, the gating tube 114 is gated open by the pulse from output 104 when the red video signal pulse 90 is applied and a red video pulse is obtained in the plate circuit of the gating tube 114 representative of only the red intelligence. The gating tubes 116 and 118 function in a similar manner to derive separate respectively green and blue video information in their plate circuits. The plate output from the gating tubes 114, 116 and 118 are connected respectively to the low pass filters 120, 122 and 124 to obtain an envelope corresponding to the respective color information. The outputs derived from the filters 120, 122 and 124 may be utilized for transmission of a color image in any suitable manner such as described in the previous reference by Zworykin and Morton. By thus providing the sensing signals 96 of high intensity between each color triplet 90, 92, 94, it is possible to obtain separate components colors of an image with the utilization of only one pickup tube.

Although the invention has been described with respect to a system where the different color images are interleaved on one tube, it is also applicable to systems in which a camera tube is used for each component color. This would require a light source with means to project a sensing pattern on each tube. This high intensity sensing signal on each component color image would provide means for correct registration of the component color images.

While I have shown my invention in only one form, it will be obvious to those skilled in the art that it is not so limited, but is susceptible of various other changes and modifications without departing from the spirit and scope thereof.

I claim as my invention:

A color television pickup system comprising a camera tube, said camera tube comprising a photosensitive layer, said photosensitive layer deposited on one side of a spherical transparent support member, said support member embossed on the other side to form a plurality of parallel cylindrical lenses, means for focussing the light from an object onto the embossed surface of said support member, a composite color filter arranged in parallel bands for transmitting selected component colors of the focussed light from said object, said composite color filter including a single transmissive band for each component color and a high energy radiation source adjacent said composite filter to provide an auxiliary band of excitation to said photosensitive layer.

References Cited in the file of this patent
UNITED STATES PATENTS

| | | |
|---|---|---|
| 2,641,643 | Wentworth | June 9, 1953 |
| 2,696,520 | Bradley | Dec. 7, 1954 |
| 2,710,309 | Antranikian | June 7, 1955 |
| 2,723,304 | Antranikian | Nov. 8, 1955 |
| 2,727,090 | Okolicsanyi | Dec. 13, 1955 |
| 2,769,855 | Boothroyd | Nov. 6, 1956 |